Dec. 22, 1931. C. G. MINER 1,837,230
PROCESS OF PRODUCING PHOSPHORUS ACID AND HYDROGEN
Filed June 28, 1926
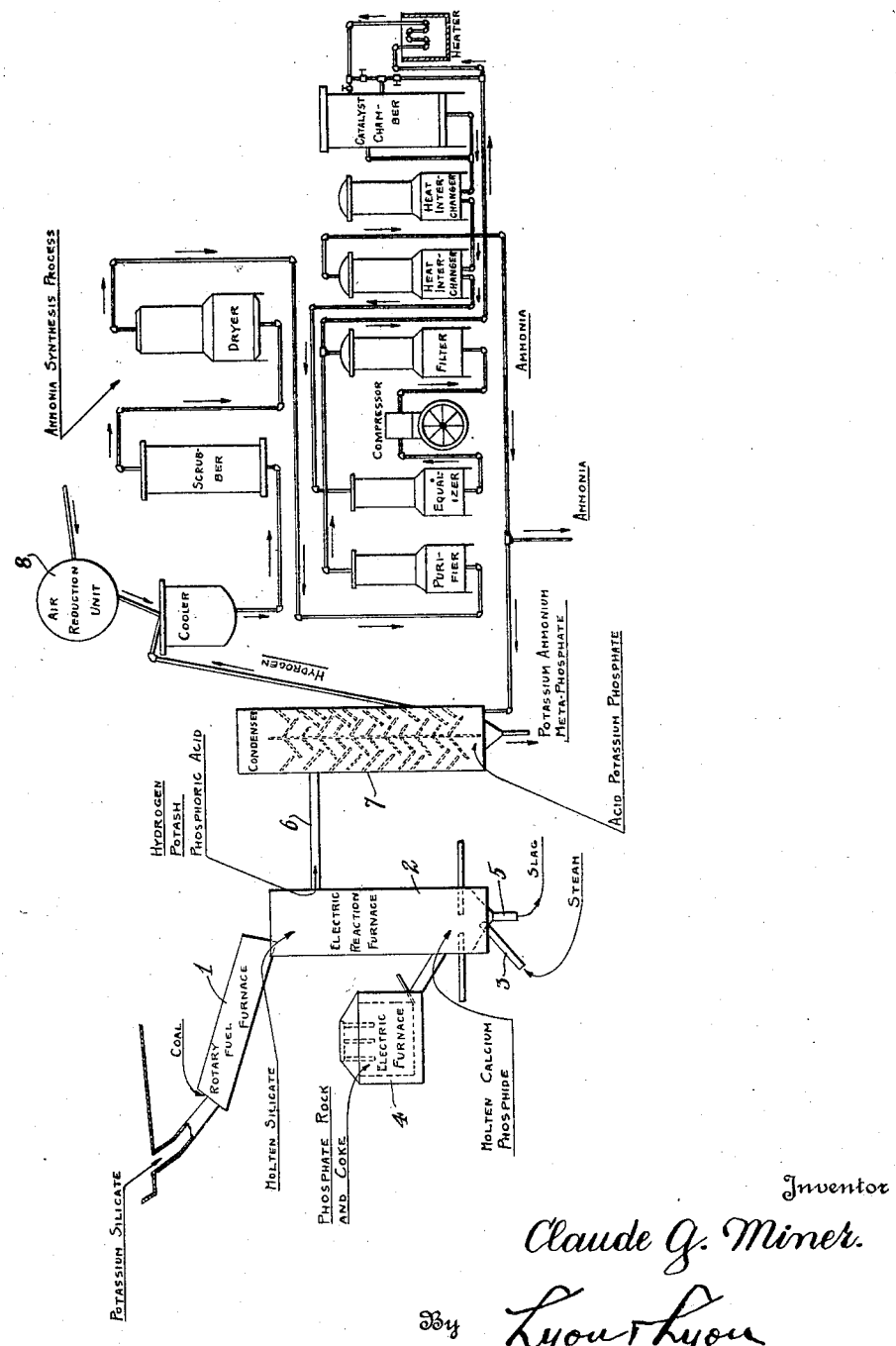
Inventor
Claude G. Miner.
By Lyon & Lyon
Attorneys Patented Dec. 22, 1931

1,837,230

UNITED STATES PATENT OFFICE

CLAUDE G. MINER, OF BERKELEY, CALIFORNIA

PROCESS OF PRODUCING PHOSPHORUS ACID AND HYDROGEN

Application filed June 28, 1926. Serial No. 119,235.

This invention relates to a method of producing phosphoric acid and other material and refers more particularly to a process of producing phosphoric acid, hydrogen or nitrogen and hydrogen as a by-product or by-products to be used in nitrogen fixation for ammonia by that process technically known as the Haber process.

Authorities agree that 60% or over of the cost of the Haber process of producing ammonia is for the production of pure hydrogen. According to this invention, phosphoric acid is produced which may be used for fertilizer or the like and which process produces hydrogen or hydrogen and nitrogen as by-products. The phosphoric acid is isolated phosphoric acid which may be used in the preparation of mono-ammonia phosphate or put to any other or desired use. The hydrogen that is produced is substantially pure hydrogen of sufficient purity for use in the Haber process.

I have discovered that phosphate rock, tricalcium phosphate or apatite may be caused to react with carbonaceous material to produce calcium phosphide in an electric furnace of the calcium carbide type according to the following reaction:

(1) $Ca_3(PO_4)_2 + 8C = Ca_3P_2 + 8CO$

I have also discovered that the calcium phosphide produced may be tapped from the aforementioned electric furnace in a molten state into an enclosed reaction chamber or furnace wherein there may be brought into contact with a slag forming agent, such as silica and water or steam, to produce a slag and phosphoric acid and hydrogen as a by-product. In case silica is employed as a slag forming agent calcium silicate will be produced.

I have also discovered that the enclosed reaction furnace and slag forming agent should be preferably heated from approximately 1200° to 1400° C. so that on admission of the calcium phosphide and water, the following reaction will take place spontaneously:

(2) $Ca_3P_2 + 3SiO_2 + 9H_2O = 3CaSiO_3 + 2HPO_3 + 8H_2$

The meta-phosphoric acid produced during this reaction is volatilized and leaves the reaction chamber and may be condensed by any suitable or desirable method.

I have also discovered that phosphide of other metals, such as potassium and magnesium phosphide and the like, may be employed in the formation of the meta-phosphoric acid and by-product hydrogen and that silica, either in the form of silica or in other allied forms, such as ferro-silicon or potassium silicate or other like sources of silica, may be used to provide the slag forming agent so that the reaction might be represented as $R_3P_2 + 3SiO_2 + 9H_2O = 3RSiO_3 + 2HPO_3 + 8H_2$ in which reaction $R_3P_2$ represents a metallic phosphide.

When silicon is employed as the slag forming agent, the reaction might be represented as follows:

(3) $Ca_3P_2 + 3Si + 15H_2O = 3CaSiO_3 + 2HPO_3 + 14H_2$

When a potassium silicate is employed, such as potassium aluminum silicate, the following action would occur:

(4) $2Ca_3P_2 + K_2O.Al_2O_3.6SiO_2 + 17H_2O = 6CaSiO_3.Al_2O_3 + 2KPO_3.2HPO_3 + 16H_2$

According to this latter reaction a calcium aluminum silicate, potassium meta-phosphate and hydrogen would be formed, the potassium employed during this latter reaction provides a source of potash which might be employed either as potassium meta-phosphate or in any other desired or preferred form as a fertilizer. In this latter reaction, any potassium silicate might be employed including the green sands which occur on the Atlantic coast.

I have also discovered that by admitting air with the steam into the reacting furnace that the metallic phosphide and slag forming agent, steam and air, may be caused to react together to produce not only phosphoric acid but hydrogen and nitrogen essentially in the correct ratio for ammonia synthesis according to the Haber process, and that the same amount of hydrogen is produced per given weight of phosphate rock as in the case where the air is omitted. The latter reaction might be represented as follows:

(5) $17Ca_3P_2 + 51SiO_2 + 133H_2O + (10O_2 + 38N_2) = 51CaSiO_3 + 34HPO_3 + 38N_2 + 116H_2$ in which equation the term $(10O_2+38N_2)$ is used to represent the constituents of air entering into the reaction.

In the accompanying drawing is diagrammatically illustrated one form of apparatus for the production of phosphoric acid and other materials according to this invention.

In the illustrated embodiment of this invention, 1 illustrates a rotary fuel furnace into which the slag forming agent, such as silica, is introduced and slagged or melted by means of heat obtained from the combustion of coal introduced into the furnace 1 simultaneously or separately. A molten slag forming agent is produced which is tapped into an enclosed reacting furnace 2.

Phosphate rock is reacted with carbon in the electric furnace 4 to produce calcium phosphide in accordance with the first reaction set forth.

The molten phosphide produced is drawn off from the furnace 4 and introduced through a trap into the enclosed electric furnace 2 and caused to react with the molten slag forming agent and steam which is admitted through the inlet 3. The reaction chamber is maintained preferably at a temperature of substantially from 1200° to 1400° C. and the reaction will proceed in accordance with the second reaction set forth. The slag of the metallic silicate can be tapped from the reacting furnace 2 at 5 and disposed of in any suitable manner.

In order to produce the requisite slag, I have discovered that an excess of slag forming agent is required over that theoretically represented by the second equation above written and that an excess of approximately 20% produces the most efficient operation.

In case potassium aluminum silicate is introduced from the furnace 1 into the furnace 2 and the reaction carried on in accordance with the fourth reaction above written, the potassium meta-phosphate and hydrogen vaporize from the furnace and are conducted through a conduit 6 to a condenser 7 where the acid potassium phosphate is condensed. The hydrogen conducted away from the furnace 2 may be used in an ammonia synthesis process diagrammatically illustrated in the accompanying drawing wherein ammonia is produced. A solution of the ammonia produced may be returned to the condenser 7 and caused to react with the acid potassium metaphosphate to produce potassium ammonia meta-phosphate which is an efficient fertilizer. The remainder of the ammonia used may be collected and used as desired.

The ammonia synthesis process diagrammatically illustrated in the accompanying drawing is well understood in the art and it is therefore not believed necessary for applicant to specifically describe the same.

In the diagrammatic illustration of this invention illustrated in the accompanying drawing, it is assumed that pure steam is admitted into the reacting chamber 2 and that the hydrogen from which the acid potassium meta-phosphate or the meta-phosphoric acid is condensed is conducted to a cooler and mixed with nitrogen prepared by the reduction of air from an air reduction unit 8. This air reduction unit 8 may be eliminated according to this invention by introducing with the steam into the reaction furnace 2 air along with the steam so that not only hydrogen but a mixture of hydrogen and nitrogen are produced in substantially the correct ratio for the synthesis of ammonia.

In the case where potassium is not employed, it is preferable that the phosphoric acid vapors which pass from the reaction chamber 2 be passed through a weak solution of acid of from about 15% to 10% phosphoric acid, which, it has been found, absorbs the acid much better and more readily than water. In this case the phosphoric acid anhydride produced, in accordance with reactions 2, 3 and 5, combines with the water to produce phosphoric acid in accordance with the following well-known reaction:

(6) $H_2O + HPO_3 = H_3PO_4$

It will be obvious from the foregoing that this process consists in reducing phosphate rock or a similar metallic phosphate to the metallic phosphide which is then tapped in the molten state into an enclosed reacting furnace and caused to react in the said furnace with a pre-heated slag forming agent and steam which is blown into the furnace through the molten mixture to produce a metallic silicate phosphoric acid and hydrogen and that on condensing or absorbing the phosphoric acid, we have pure hydrogen. It will also be obvious that in the case where air is introduced with the steam that on condensation with the phosphoric acid, we will have a mixture of pure hydrogen and nitrogen.

Having fully described my invention, it is to be understood that I do not wish to be limited to the details herein set forth, which may obviously be varied without departing from the spirit of my invention as set forth in the appended claims.

I claim:

1. A process of producing a phosphoric acid and by-product gases which comprises causing calcium phosphide, steam and silica to react at an elevated temperature in accordance with the following reaction:

$Ca_3P_2 + 3SiO_2 + 9H_2O = 3CaSiO_3 + 2HPO_3 + 8H_2$

2. A process of producing a phosphoric acid from phosphate rock which comprises reacting the phosphate rock with carbon to produce a molten metallic phosphide, conducting the molten phosphide to a reacting chamber into which preheated silica has been admitted and causing the said metallic phosphide and silica to react with steam at a temperature between 1200° and 1400° C.

3. A process of the class described comprising causing calcium phosphide to react with a potassium silicate compound and steam to form potassium meta-phosphate and hydrogen.

Signed at San Francisco this 16 day of June, 1926.

CLAUDE G. MINER.